United States Patent [19]
Davison

[11] Patent Number: 6,073,734
[45] Date of Patent: Jun. 13, 2000

[54] DRUM BRAKE DUST SHIELD

[75] Inventor: Kent E. Davison, Columbia, Ind.

[73] Assignee: Dana Corporation, Toledo, Ohio

[21] Appl. No.: 09/001,746

[22] Filed: Dec. 31, 1997

[51] Int. Cl.[7] ............................................. F16D 65/10
[52] U.S. Cl. ......................................................... 188/218 A
[58] Field of Search ........................... 188/218 A, 264 W, 188/18 A; 301/37.1, 6.91

[56] References Cited

U.S. PATENT DOCUMENTS

| 1,320,551 | 11/1919 | Holley ............................ 188/264 W |
| 1,641,081 | 8/1927 | Heymann . | |
| 4,082,363 | 4/1978 | Goodbary .......................... 301/6.91 |
| 4,164,273 | 8/1979 | McElroy . | |
| 4,441,762 | 4/1984 | Segal ................................. 301/37.1 |
| 4,540,069 | 9/1985 | Bolenbaugh et al. . | |

FOREIGN PATENT DOCUMENTS 40143   4/1927   Nauru .

*Primary Examiner*—Chris Schwartz
*Attorney, Agent, or Firm*—Oldham & Oldham Co., L.P.A.

[57] ABSTRACT

A dust shield for the inboard side of a brake assembly of a vehicle wheel end is formed from a pair of planar members which are shaped and adapted to be fitted together to form an annular disc having an external diameter and an internal diameter. An internal periphery is defined by the internal diameter which preferably includes a flanged surface for affixing the annular disc to the wheel end. The pair of planar members are semicircular annular portions, having an arcuate outer edge and an inner edge, the inner edge comprising two straight portions with an intermediate semicircular portion. Complementary means, preferably sets of corresponding tabs and mating slots, for affixing the first and second planar members to each other to form the annular disc are provided on the inner edges of the planar members.

10 Claims, 2 Drawing Sheets

DRUM BRAKE DUST SHIELD

The present invention relates to a dust shield for use in association with a brake spider of a drum brake of a vehicle such as a trailer. More particularly, the present invention relates to a two-piece dust shield which protects the internal working parts of the brake from rocks, debris and the like. Even more particularly, the present invention relates to a dust shield for the inboard side of the brake which may be installed or removed without disassembly of the wheel end assembly.

BACKGROUND OF THE INVENTION

The use of a dust shield with a vehicle wheel brake assembly is known in the prior art. Such a dust shield is generally found on the inboard side of the vehicle brake assembly, the outboard side of the brake assembly being effectively shielded by the wheel hub and rim. In one type of dust shield known in the art, the dust shield is a one piece member which bolts to the inboard side of the brake spider. In another of the prior art dust shield devices, the shield is formed from a resilient and flexible flanged disc which is centrally apertured and split partially transversely to allow installation. Such a shield has a plurality of L-shaped brackets attached thereto around the central aperture. These provide surfaces for affixing a clamping ring to hold the shield to the axle. A portion of the partial transverse split provides an opening for the brake camshaft to pass through the dust shield, but the remainder of the partial transverse split provides a continuing opportunity for intrusion of water, dust and the like.

A dust shield which bolts directly to the brake spider increases the structural requirements of the spider and thus increases the weight of the spider. This type of shield also limits the ability to use a single shield design in association with different. brake drum and shoe widths. The flexibility necessary to install a one-piece dust shield around the axle without removing the wheel end assembly imparts an inherent: "floppiness" to the shield which is undesirable, particularly to shield the brake assembly, from impact from rocks and the like.

It is therefore an object of the present invention to provide an inboard dust shield for a vehicle brake assembly which may be used with a variety of widths of brake drums and shoes and which provides a generally rigid surface extending radially outwardly from the axle to protect the brake assembly from impact from stones and other road debris.

SUMMARY OF THE INVENTION

This and other objects of the present invention are provided by a device for shielding a brake assembly of a vehicle wheel end. Such a device comprises first and second generally planar members, which are members shaped and adapted to be fitted together to form a substantially continuous annular disc having an external diameter and an internal diameter. An internal periphery of the annular disc defined by the internal diameter is provided with means for affixing the annular disc to the wheel end, the preferred means being a flange for clamping the disc to the axle.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

Figure 1:
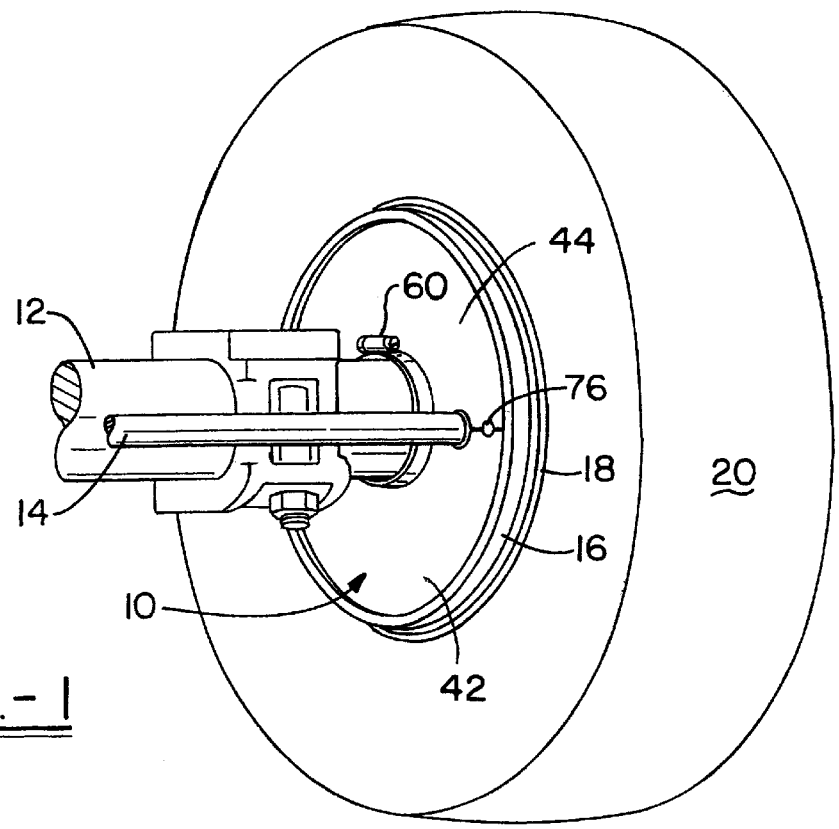
FIG. 1 shows a perspective view of a wheel end assembly having the dust shield of the present invention installed.
Figure 2:
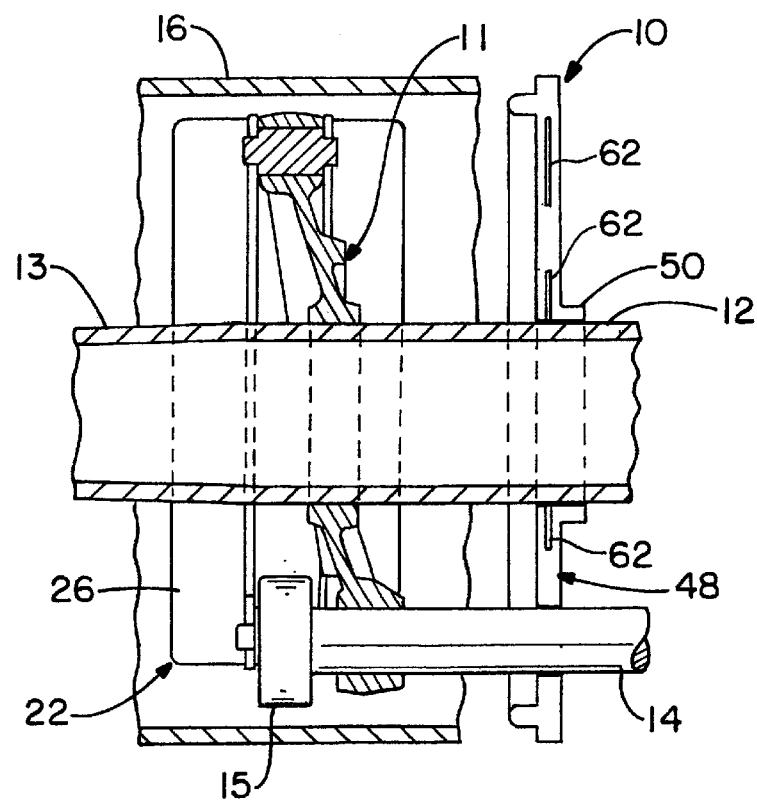
FIG. 2 shows a bottom cross-sectional view of the wheel end assembly having the dust shield of the present invention installed.
Figure 3:
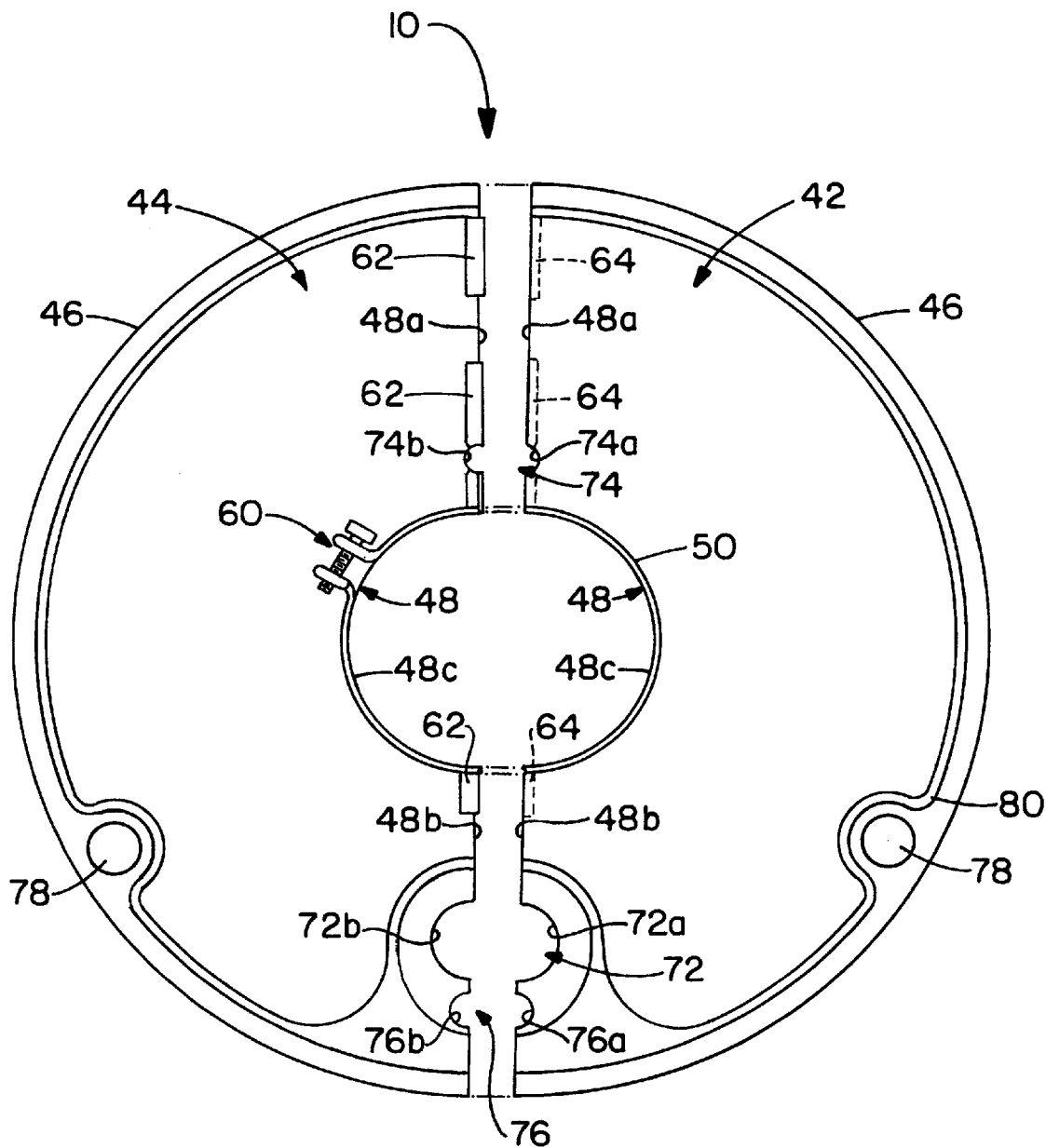
FIG. 3 shows a front elevation view of the assembled dust shield isolated from the wheel end assembly.

The preferred embodiment of the present invention illustrated in FIGS. 1 through 3 discloses a device for shielding a brake assembly of a vehicle wheel end, especially for shielding the brake components from water, rocks, debris and the like, particularly such materials which originate from the inboard side of the wheel end. In the invention as shown installed on a vehicle wheel end from the inboard side of the wheel end in FIG. 1, the device 10 is positioned on the axle 12 and is affixed thereto. The axle 12 has a brake spider 11 non-rotatably affixed thereto as by welding and upon which a pair of brake shoes 22 are mounted. The axle terminates outboard of the spider 11 in a spindle 13. The outer arcuate surfaces of the brake shoes are brake tables 26 which have brake pads mounted to them. When a brake actuating means (not shown) at an inboard end of a cam shaft 14 having an S-shaped cam 15 on its outboard end causes the cam shaft and cam to rotate, the action of the cam on the brake shoes 22 move them radially outward so that the brake pads make frictional contact with a brake drum 16. This brake drum 16 is affixed within a wheel rim 18 mounted rotatably upon the spindle 13. A tire 20 mounted on the wheel rim 18 is braked by the rotation of the cam shaft 14.

As shown in FIG. 2, the dust shield 10 is assembled from a first and a second generally planar member 42, 44, respectively. These planar members 42, 44 are substantially mirror images of each other. Complementary mating parts, as will be described further below, have been used in the embodiment selected for illustration and these mating parts are not mirror images. The first and second planar members 42, 44 are shaped and adapted so that they may be assembled to form an annular disc which will be recognizable as the dust shield 10. In the embodiment shown, the first and second planar members 42, 44 are semicircular annular portions of the annular disc. Each of the planar members has a arcuate outer edge 46 and an inner edge 48. the inner edge comprising two straight portions 48a, 48b with an intermediate semicircular portion 48c. When assembled to provide the annular disc 10, the first and second planar members 42, 44 coact so that the annular disc has an external diameter defined by the respective outer edges 46 and an internal diameter defined by the intermediate semicircular portion 48c of inner edge 48. When installed, the dust shield 10 has an external diameter which extends outwardly radially from the axle 12 at sufficient distance to cover the annular space between the outside of the axle and the inside of the brake drum 16. The internal diameter of the annular disc 10 is slightly, larger than the external diameter of the axle 12, so that the dust shield may fit around the axle. In the illustrated embodiment, the internal diameter has a flange 50 provided around its periphery to provide a surface for affixing the annular disc 10 to the axle 12. When this peripheral flange 50 is secured to the axle 12 through use of an appropriate securing means, such as a T-bolt band clamp 60, the annular disc is positioned substantially normal to the axis of the axle.

Although it would be possible to use only the T-bolt band clamp 60 to hold the first and second planar members 42, 44 in place around the axle 12, it is preferred to use the complementary mating parts mentioned above to further secure the members to each other. When the planar members 42, 44 are properly positioned around the axle, the straight portions 48a, 48b of the inner edge 48 of each members abut each other. In one instance, one of the planar members 44 will have tabs 62 positioned along the straight portions 48a, 48b and the other planar member 42 will have complementary slots 64 to accept the tabs 62. The interaction of these complementary mating parts 62, 64 hold the planar members 42, 44 together and prevent separation of the members along the abutment of inner edges 48 on the respective planar members.

A desirable property of the dust shield 10 of the present invention is the ability to remain rigid even when struck by some of the larger particles which may be expected to be encountered while driving at highway speeds. When the dust shield of the type taught by the present invention is installed, the only area which is actually attached to the vehicle is the peripheral flange 50. The external periphery of the dust shield 10 inherently must remain unattached, and it is subject to being deflected into the brake assembly if struck by a rock or the like. When a flexible resilient one piece dust shield as is known in the prior art is employed, the flexibility needed to install the dust shield renders the external periphery of the device so floppy that the impacts of rocks and the like, particularly near the external periphery will deflect the shield into the brakes, possibly resulting in a dangerous condition. To provide a radial rigidity to the dust shield, the present invention dust shield will employ a thicker and more rigid material. For example, the preferred material for the present invention is a 16 gauge steel. Also, it would be possible to provide the dust shield with radial ribbing or the like to increase rigidity. This is not to say that non-metallic, especially polymeric materials cannot be used in the present invention. Instead, the present invention has the capability to use a metallic material, especially a rigid sheet of metal, since the property of flexibility, which is required in some prior art dust shields, is in fact an undesired property in the present invention.

Anyone familiar with drum brakes of the type with which the present invention would be employed realizes that the axle 12 is not the only element which must pass through the dust shield 10. As shown in FIG. 1, the shaft 14 for the brake cam must pass through the dust shield, the axis of the shaft 14 being parallel to, but offset from, the axis of the axle 12. Further, the use of advanced technology such as anti-lock brakes requires a conduit for passing data acquired from rotational speed sensors in the brake assembly to the vehicle. The bushing in the brake spider through which the cam shaft 14 passes will require a grease zerk. It is common to place the grease zeri( on the inboard side of the spider, so an access hole to the zerk may be needed. In the preferred embodiment of the present invention, these access points are provided by providing at least one set of complementary semicircular cutouts along the inner edges of the first and second planar members. When the first and second planar member,; are placed into their intended abutting positions with the inner edges of the respective planar members aligned, these complementary semicircular cutouts combine to provide circular apertures. Several of these are shown in FIG. 3. For example. semicircular cutouts 72a and 72b on planar members 42 and 44 respectively combine to provide circular aperture 72 for allowing passage of the brake cam shaft. Semicircular cutouts 74a and 74b on planar members 42 and 44 respectively combine to provide circular aperture 74 for allowing passage of an antilock-braking system sensor cable. Semicircular cutouts 76a and 76b on planar members 42 and 44 respectively combine to provide circular aperture 76 for allowing access to a grease zerk.

An additional advantage of mounting the dust shield 10 to the axle 12 rather than the brake spider is the abilty to use a single dust shield design with different widths of brake shoes and brake drums. In practice, the dust shield 10 will be proximate to, but axially spaced apart from, the brake table and brake drum. If in a particular application the width of the brake table and brake drum are increased, the same axial spacing may be maintained by moving the point of affixation of the dust shield to the axle, since the axle has an essentially constant diameter.

When the preferred embodiment of the dust shield 10 of the present invention is used, the annular disc of the shield will extend radially outwardly from the axle in cl substantially normal fashion and the external periphery of the annular disc will extend out as far away from the axle axis as the brake table, brake friction pads and the brake drum. For this reason, visual inspection of the brake friction pads from the inboard side will be substantially impeded by the dust shield, unless one or more inspection apertures 78 are provided around the circumference of the annular disc at a radius corresponding to the radial distance of the brake friction pads from the axle axis when the brakes are in their unengaged condition.

In some embodiments of the present invention, it may be desirable to provide a flange 80 near the external periphery of the annular disc. The flange 50 near the a internal periphery projects out of the plane of the planar members 42, 44 in a first direction which would represent the inboard side of the dust shield when installed. If flange 80 is used, it is preferred to extend out of the plane of the planar members 42, 44 in the opposite direction, that is, the direction which represents the outboard side of the annular disc. In other words, the flange 80 projects toward the brake pad and drum rather than away from them.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. In combination with a vehicle wheel end, comprising an axle terminating in a spindle upon which a wheel rim having a brake drum is mounted, with a brake assembly having a plurality of brake pads for engaging the brake drum affixed to the axle, an improved device for shielding the brake assembly comprising:

first and second generally planar members, said planar members shaped and adapted to be fitted together to form an annular disc having an external diameter and an internal diameter, an internal periphery defined by the internal diameter provided with a T bolt band clamp for affixing the annular disc to the wheel end, wherein the first and second planar members are semicircular annular portions, having an arcuate outer edge and an inner edge, the inner edge comprising two straight portions with an intermediate semicircular portion; and wherein the straight portions of the inner edge of the first and second planar members are provided with sets of corresponding tabs and mating slots for affixing the first and second planar members to each other to form the annular disk.

2. The combination of claim 1 wherein the inner edges of the first and second planar members are provided with at least one set of complementary semicircular cutouts to define at least one circular aperture therethrough.

3. The combination of claim 2 wherein one of the at least one circular apertures is provided for passage of a brake cam shaft therethrough.

4. The combination of claim 2 wherein one of the at least one circular apertures is provided for passage of a antilock braking system cable therethrough.

5. The combination of claim 2 wherein one of the at least one circular apertures is provided for access to a grease zerk.

6. The combination of claim 1 wherein the annular disc is mounted to the axle about its internal periphery inboard of the brake assembly.

7. The combination of claim 6 wherein the annular disc is positioned substantially normal to the axis of the axle.

8. The combination of claim 1 wherein the internal periphery of the annular disc is provided with a flange.

9. The combination of claim 1 wherein each of the first and second planar members is provided with an aperture for viewing the brake pads.

10. The combination of claim 1 wherein the annular disc formed from the first and second planar members is a substantially continuous rigid surface.

* * * * *